UNITED STATES PATENT OFFICE.

JAMES L. SNEED AND JOHN E. KIRTLEY, OF FRANKFORT, KENTUCKY.

IMPROVEMENT IN MINERAL PAINT.

Specification forming part of Letters Patent No. 163,273, dated May 11, 1875; application filed October 13, 1874.

*To all whom it may concern:*

Be it known that we, JAMES L. SNEED and JOHN E. KIRTLEY, of Frankfort, in the county of Franklin and in the State of Kentucky, have invented certain new and useful Improvements in Mineral Paint; and do hereby declare that the following is a full, clear, and exact description thereof.

Our invention consists in the production of a paint made from a certain rock found in a high range of hills running north and south about six miles west of Frankfort, Kentucky. It is in beds from one to four feet thick, and may be easily found in the locality stated above.

This rock or marly shale has a delicate olive-grey color, is quite soft, easily worked, and is better adapted to the purposes for which paint is usually employed than the ordinary paint made from the carbonate of lead, as it contains nothing which would injure or decompose the oil or varnish with which it may be mixed for paint, and is itself of a durable nature, not being soluble in water, or liable to be changed by atmospheric agencies. As it contains no poisonous ingredients, it is admirably adapted to the painting of roofs from which water may be collected for culinary purposes, and for which white lead, zinc white, and many other metallic paints are unsuitable. As this marly shale contains notable proportions of the alkalies, phosphoric acid, and lime, &c., it could be used with advantage on exhausted soils.

The chemical analysis of this rock shows that the following are its constituent elements: silica, alumina, protoxide of iron, lime, magnesia, potash, soda, phosphoric acid, sulphur, and carbonic acid.

This rock is ground fine and mixed with oil in the same manner as white lead or other paints are mixed, and it can be used for the same purposes. This makes a paint equal to the best of white lead at one-fourth the cost, and it contains no poisons to injure the health of the painter, as white lead and zinc paint do. It is well suited for roofing where the rain-water is used for culinary purposes, being free from any poison which white lead and zinc paints have.

I am aware that a paint formed by mixing oil with a pulverized mineral rock is, broadly, not new.

Having thus fully described our invention, what we claim as new, and desire to secure by Letters Patent, is—

A paint made from the rock herein described, the constituents of which are silica, alumina, protoxide of iron, lime, magnesia, potash, soda, phosphoric acid, sulphur, and carbonic acid, by pulverizing the rock and mixing with oil and pigments, if required.

In testimony that we claim the foregoing we have hereunto set our hands this 28th day of September, 1874.

JAS. L. SNEED.
J. E. KIRTLEY.

Witnesses:
I. T. HOCKENSMITH,
W. S. BRUNSON.